(12) United States Patent
Chrissos et al.

(10) Patent No.: US 7,770,844 B2
(45) Date of Patent: Aug. 10, 2010

(54) CARGO ROLLER TRAY SHEAR FITTING

(75) Inventors: Philip O. Chrissos, Maryland Heights, MO (US); James Greenwood, St. Peters, MO (US); James B. Warner, Glendale, MO (US)

(73) Assignee: The Boeing Company, Chicago, IL (US)

(*) Notice: Subject to any disclaimer, the term of this patent is extended or adjusted under 35 U.S.C. 154(b) by 433 days.

(21) Appl. No.: 11/759,415

(22) Filed: Jun. 7, 2007

(65) Prior Publication Data

US 2008/0302909 A1    Dec. 11, 2008

(51) Int. Cl.
*B64C 1/22* (2006.01)
*B64C 1/06* (2006.01)

(52) U.S. Cl. .................... 244/118.1; 244/131

(58) Field of Classification Search ............ 244/118.1, 244/117 R, 119, 129.1, 118.5, 137.1, 131
See application file for complete search history.

(56) References Cited

U.S. PATENT DOCUMENTS

| | | | | | |
|---|---|---|---|---|---|
| 2,259,624 | A | * | 10/1941 | Dornier | 244/119 |
| 2,276,391 | A | * | 3/1942 | Hathorn | 403/346 |
| 2,325,900 | A | * | 8/1943 | Anderson | 244/117 R |
| 3,363,372 | A | * | 1/1968 | Burt | 52/91.3 |
| 6,554,225 | B1 | * | 4/2003 | Anast et al. | 244/117 R |
| 2007/0102839 | A1 | * | 5/2007 | McGowan et al. | 264/101 |

* cited by examiner

*Primary Examiner*—Tien Dinh
(74) *Attorney, Agent, or Firm*—Lee & Hayes, PLLC

(57) ABSTRACT

A cargo roller tray shear fitting that may be used to fasten a cargo roller tray to a floor beam. The shear fitting may include a back plate having at least one slot. A lug extends from the back plate and has a lug opening.

13 Claims, 6 Drawing Sheets

CARGO ROLLER TRAY SHEAR FITTING

BACKGROUND

1. Technical Field

Embodiments of the disclosure relate to shear ties in general and shear ties used to fasten a cargo roller tray to a floor beam.

2. Description of the Related Art

Cargo roller trays are used in vehicles (e.g., air craft, ships, trucks, etc.) and storage locations (e.g., holds, containers, and warehouses, etc.) to speed the movement of cargo. Typically, the cargo roller trays are joined to structural supports (e.g., floor beam, floor joists, etc) or a floor using fasteners.

The cargo roller trays in the past have been attached to structural supports by positioning the cargo roller tray on the support, drilling holes through both the cargo roller tray and the support, and then inserting fasteners though the holes. This fastening process required the installer to drill holes and to clean up the drill shavings after the holes were drilled. This process also required the use of backing plates for the fasteners, since the tension in the fastener held the cargo roller tray in position.

In an effort to speed the assembly process, both the support and the cargo roller tray are predrilled. However, when the holes in the cargo roller tray and the support did not line up, re-work was required Accordingly, there is a need for a cargo roller tray shear fitting that can fasten the cargo roller tray to the support such that re-work is minimized when using predrilled components.

SUMMARY

Embodiments of the disclosure may advantageously address the problems identified above by providing, in one embodiment, a shear tie for joining a cargo roller tray to a support. The shear tie includes: a base plate having at least one slot; and a first lug having at least one lug opening, the first lug extending from the base plate.

In another embodiment a structure includes: a floor beam; a cargo roller tray; and a cargo roller tray shear fitting fastening the cargo roller tray to the floor beam. The shear fitting also includes a base plate having at least one slot; and a first lug having a first lug opening, the first lug extending from the base plate. The first lug is attached to the cargo roller tray using the first lug opening. The base plate is attached to the deck beam using the at least one slot. And the at least one slot permits the position of the cargo tray shear fitting to shift a predetermined distance along the length of the floor beam.

In a further embodiment an airplane includes a fuselage having a floor beam; a cargo roller tray; and a cargo roller tray shear fitting fastening the cargo roller tray to the floor beam. The shear fitting includes a base plate having at least one slot; and a first lug having a first lug opening, the first lug extending from the base plate. The first lug is attached to the cargo roller tray using the first lug opening. The base plate is attached to the deck beam using the at least one slot. And the at least one slot permits the position of the cargo tray shear fitting to shift a predetermined distance along the length of the floor beam.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

The accompanying drawings incorporated in and forming part of the specification illustrate several embodiments of the disclosure. In the drawings.

Reference will now be made in detail to embodiments of the disclosure, examples of which are illustrated in the accompanying drawings.

DETAILED DESCRIPTION

The use of the disclosed shear tie may speed joining a cargo roller tray to a support and may reduce the amount of re-work when assembling pre-drilled components.

Figure 1:
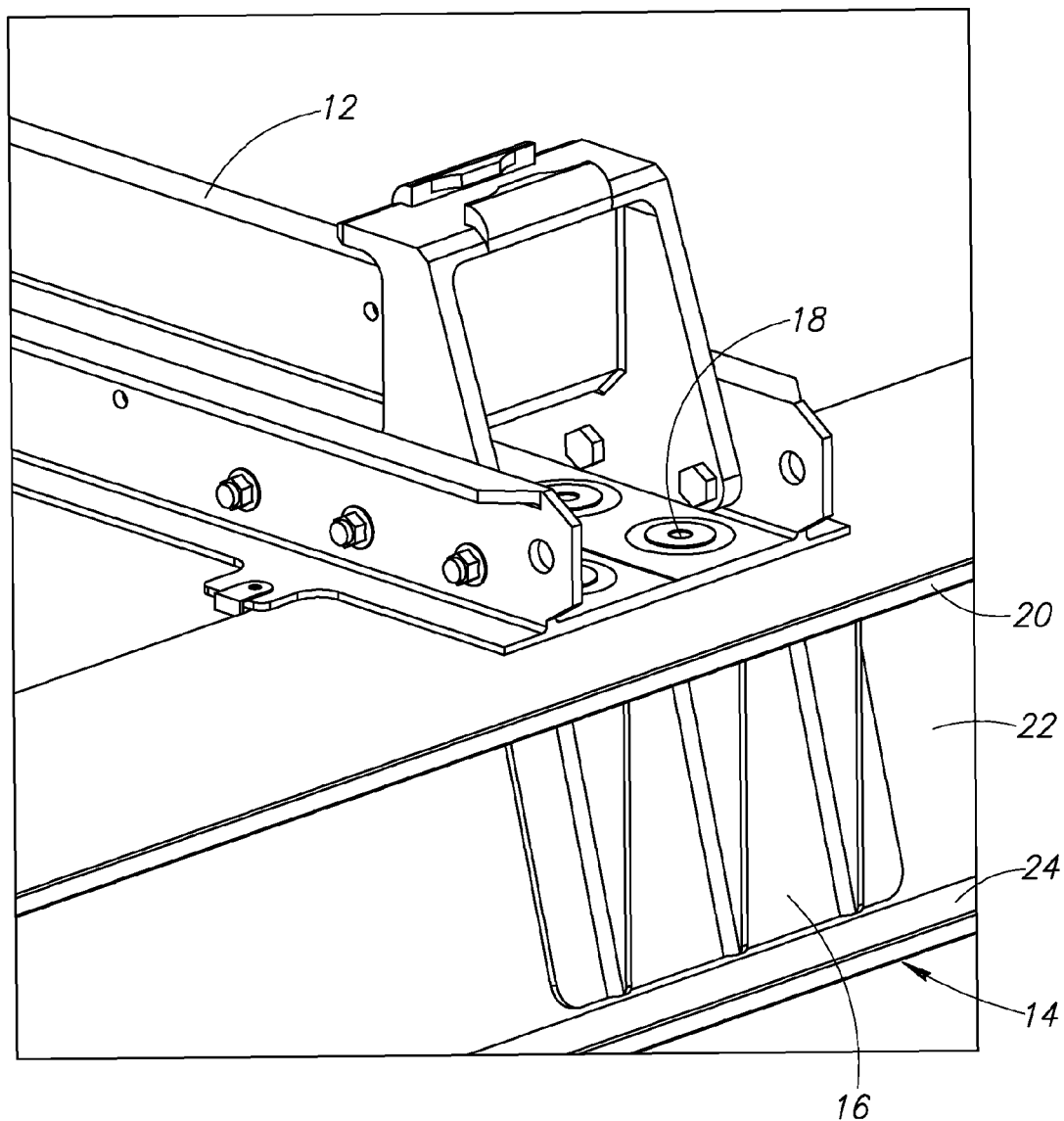
FIG. 1 illustrates a method of joining a cargo roller tray to a support as provided in the related art.

FIG. 1 shows an example from the related art of a cargo roller tray 12 joined to support 14 using fasteners 18 and backing plate 16. Backing plate 16 is used to spread the load since the tension of fasteners 18 holds the cargo roller tray 12 in position.

Figure 2A:
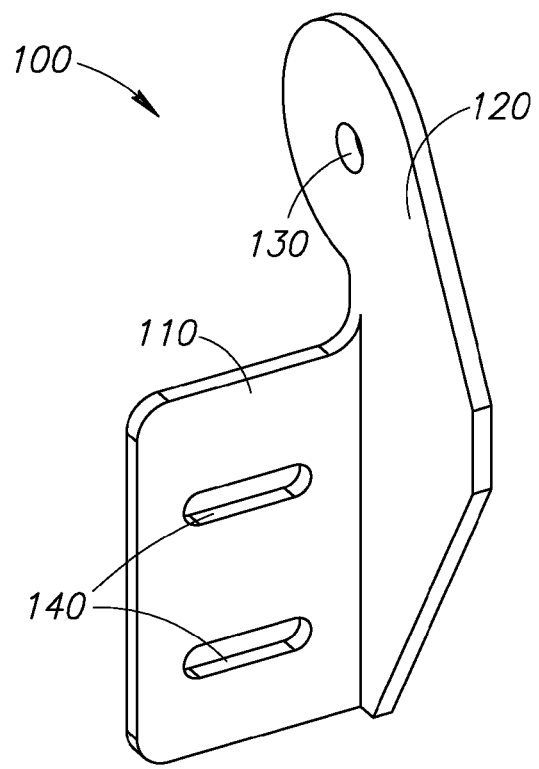
FIGS. 2A and 2B illustrate a shear tie with a single lug.

FIG. 2 illustrates one embodiment of a shear tie that may be used to join a cargo roller tray to a support. Shear tie 100 may have a back 110. Typically, back 110 has at least two slots 140 through which shear tie 100 may be fastened to the support. In some embodiments there may be one slot and in others there may be more than two slots. The number of slots depends on the size and loads on the fasteners. The slots 140 permit the position of the shear tie 100 to shift. This shift may enable joining the cargo roller tray to the support without the rework associated with holes in the cargo roller tray that do not align with holes in the support.

The shear tie 100 may also have a lug 120 with a hole or opening 130. The lug projects from the back 110. In some embodiments the angle between the lug 120 and back 110 may be approximately 90 degrees. In other embodiments the angle between the lug 120 and back 110 may be an acute or obtuse angle.

Figure 2B:
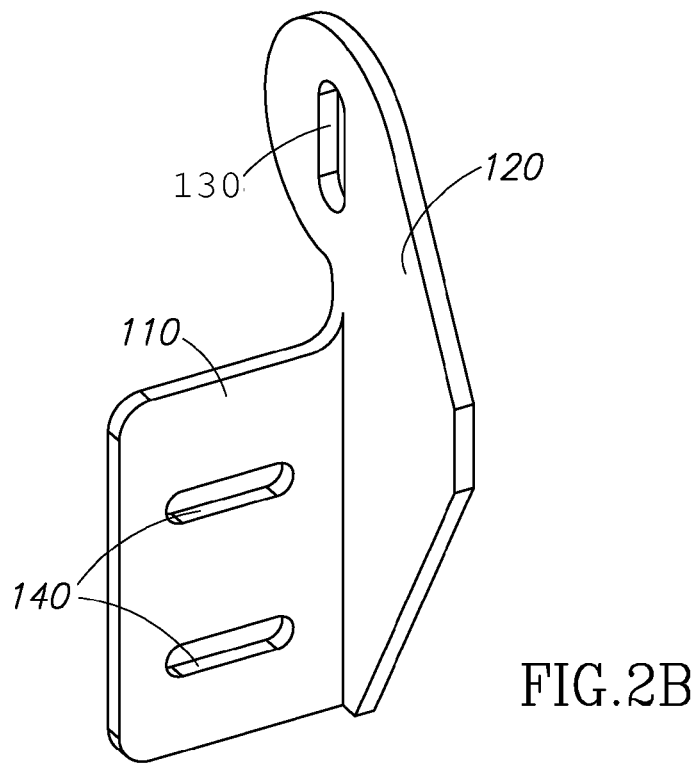

The hole or opening 130 permits the shear tie to be fastened to the cargo roller tray. In some embodiments, such as illustrated in FIG. 2B, the opening 130 may be oversized so that the opening will be capable of receiving a fastener even if the corresponding hole in the cargo roller tray is at its worst case position, but still in tolerance. In other embodiments, opening 130 may be a slot. In further embodiments the slot in the lug may be located at approximately a 90 degrees to the slot(s) 140 in the back 110.

Figure 3:
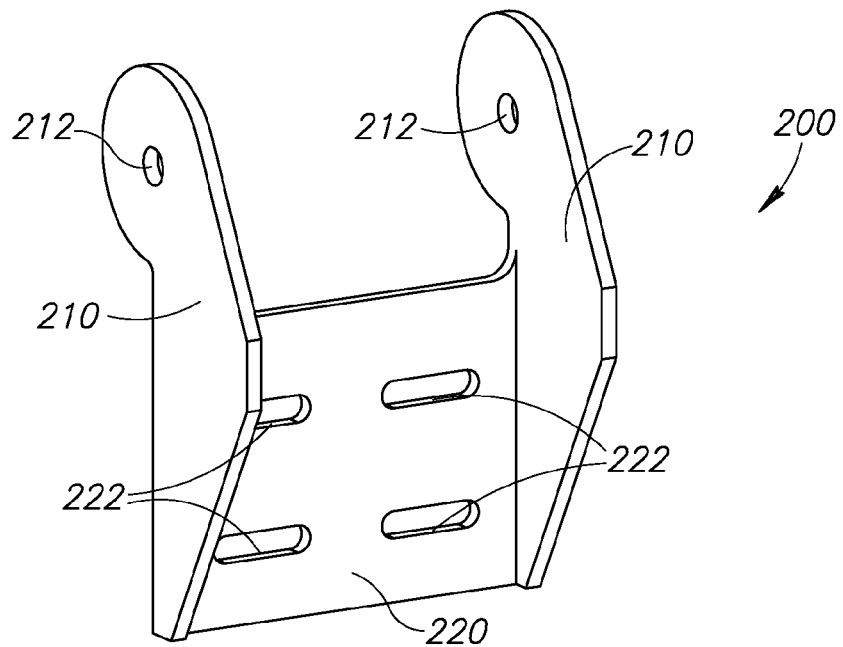
FIG. 3 illustrates a first embodiment of a shear tie with two lugs.

FIG. 3 illustrates a second embodiment of shear tie 200. In this embodiment the shear tie 200 has a back 220 and two lugs 210. Each lug may have an opening 212. The openings are similar to the opening 130 discussed above.

Similar to the back 110 discussed above, back 220 may have one or more slots 222. Slots 222 are similar to slots 140 discussed above.

Figure 4:
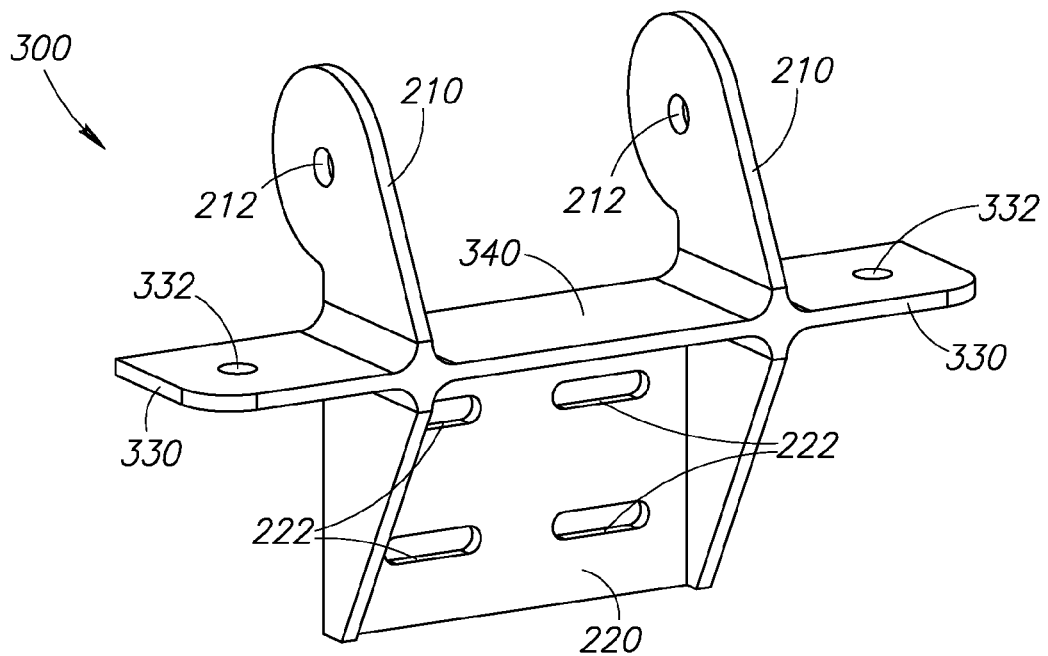
FIG. 4 illustrates a second embodiment of a shear tie with two lugs.
Figure 5:
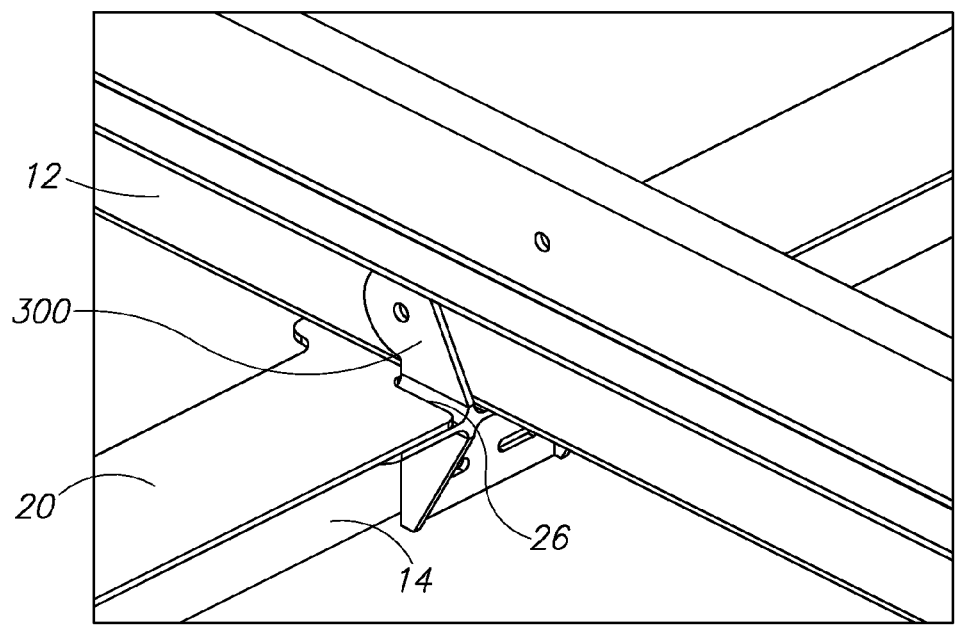
FIGS. 5 and 6 illustrate the second embodiment of the shear tie with two lugs joining a cargo roller tray to a support.
Figure 6:
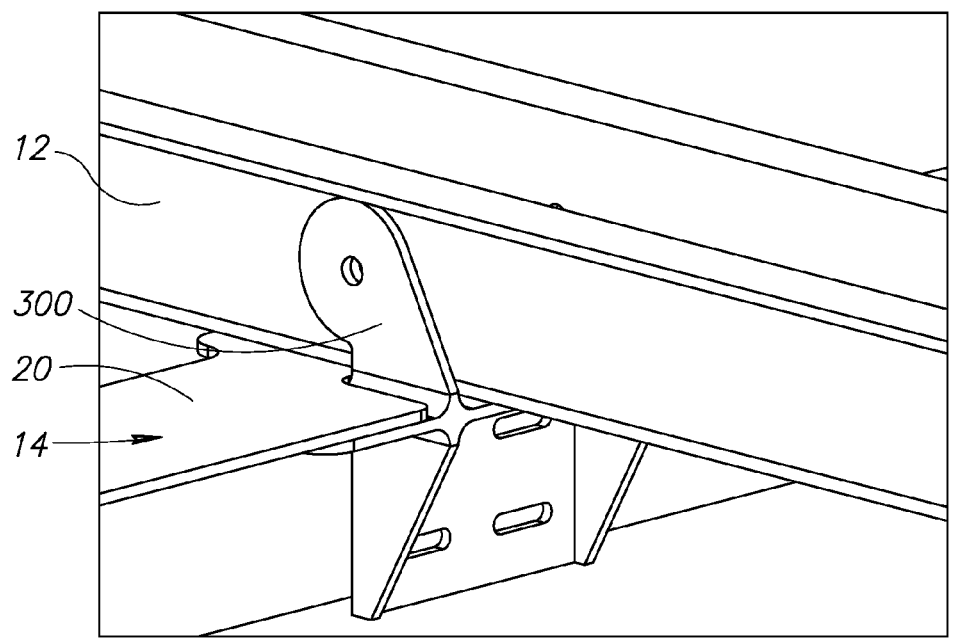

FIG. 4 illustrates a modification of the embodiment shown in FIG. 3. A similar modification may be made to the embodiment shown in FIG. 2. As illustrated in FIGS. 5 and 6, this modification may be advantageously used when a portion of a flange 20 on a support beam 14 is removed or the support beam is manufactured with a notch 26 for installation of the shear tie 300.

In, the embodiment shown in FIG. 4, the shear tie 300 includes a web 340 and web extensions 330. The remaining portions of shear tie 300 are similar to shear tie 200 discussed above. The web extensions 330 may each include a hole 332. Hole 332 is configured to permit the shear tie 300 to be fastened to the flange on a support beam.

The addition of web 340 and web extensions 330 help mitigate the loss of structural strength caused by the notch 26 in the flange 20 of the support beam 14 in which the shear tie 300 is installed.

The shear ties disclosed herein may be formed from metal using current or future metal forming techniques, e.g., casting, machining, forging, etc. The shear ties may also be formed from plastic, glass reinforced plastic, composites, etc. using current or future forming techniques, e.g., molding, machining, etc. The materials used may be selected based on the strength and weight requirements of a particular application.

Figure 7:
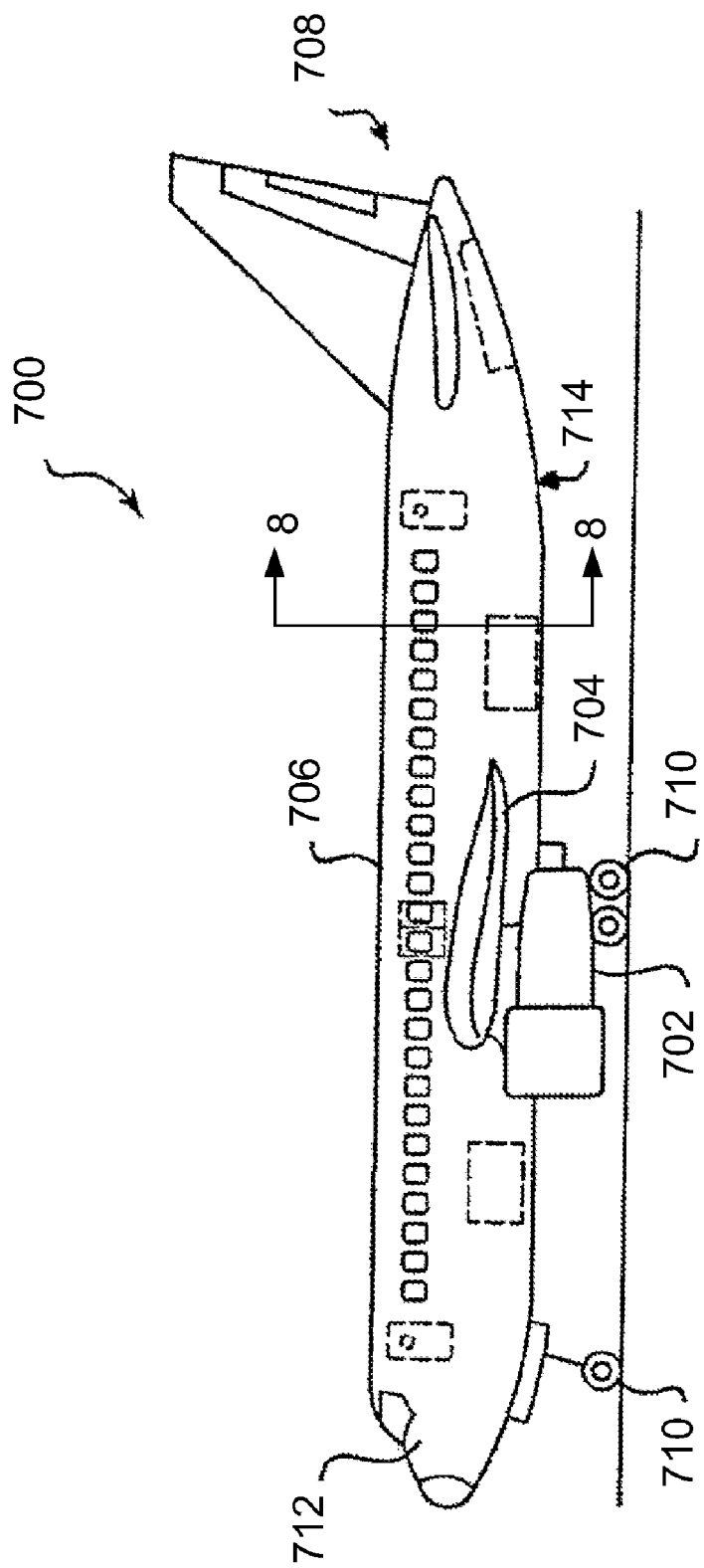
FIG. 7 illustrates an exemplary aircraft that may contain one of the embodiments illustrated above.

Referring now to FIG. 7, a side elevation view of an aircraft 700 having one or more of the disclosed embodiments is shown. With the exception of the embodiments according to the present invention, the aircraft 700 typically includes components and subsystems generally known in the pertinent art, and in the interest of brevity, will not be described further. The aircraft 700 generally includes one or more propulsion units 702 that are coupled to wing assemblies 704, or alternately, to a fuselage 706 or even other portions of the aircraft 700. Additionally, the aircraft 700 also includes a tail assembly 708 and a landing assembly 710 coupled to the fuselage 706. In some embodiments the fuselage 706, tail assembly 708 and nose assembly 712 may form an airframe 714. In other embodiments the airframe may also include wings 704.

The aircraft 700 further includes other systems and subsystems generally required for the proper operation of the aircraft 700. For example, the aircraft 700 includes a flight control system (not shown in FIG. 7), as well as a plurality of other network, electrical, EC, mechanical and electromechanical systems that cooperatively perform a variety of tasks necessary for the operation of the aircraft 700. Accordingly, the aircraft 700 is generally representative of a commercial passenger or cargo aircraft, which may include, for example, the 737, 747, 757, 767 and 777 commercial aircraft available from The Boeing Company of Chicago, Ill. Although the aircraft 700 shown in FIG. 7 generally shows a commercial aircraft, it is understood that the various embodiments of the present invention may also be incorporated into flight vehicles of other types. Examples of such flight vehicles may include manned or even unmanned military aircraft, rotary wing aircraft, ballistic flight vehicles or orbital vehicles, as illustrated more fully in various descriptive volumes, such as Jane's All The World's Aircraft, available from Jane's Information Group, Ltd. of Coulsdon, Surrey, UK. Additionally, those skilled in the art will readily recognize that the various embodiments of the present invention may also be incorporated into terrestrial or even marine vehicles.

Figure 8:
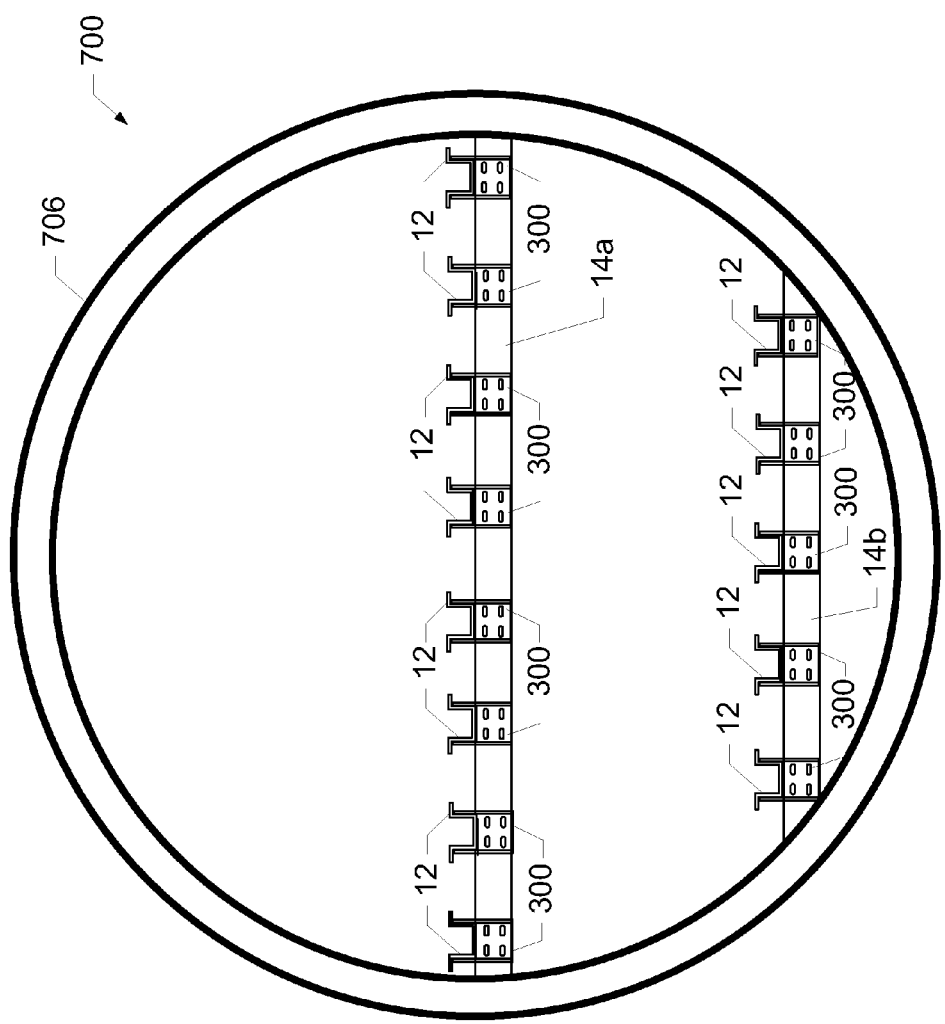
FIG. 8 illustrates a cross-section of the aircraft illustrated in FIG. 7.

As shown in the exemplary aircraft cross section in FIG. 8, the aircraft 700 may include one or more of the embodiments of the shear tie 300, which may be incorporated into various portions of the aircraft 700. In the embodiment shown in FIG. 8, an upper support 14a supports a plurality of cargo roller trays 12. The roller trays 12 are joined to upper support 14a with shear ties 300. Similarly, a lower support 14b supports a plurality of cargo roller trays 12. The roller trays 12 are joined to lower support 14b with shear ties 300. The embodiment shown in FIG. 8 may be used in an airplane 700 configured to carry primarily cargo. In an airplane configured to carry passengers, the upper support beam would be configured to support the passenger cabin instead of the cargo roller trays.

The above-described shear ties enable joining cargo roller trays to supports. These and other devices described herein may provide significant improvements over the current state of the art, potentially providing for an assembly process with reduced rework. Although the shear tie has been described in language specific to structural features and/or methodological acts, it is to be understood that the device defined in the appended claims is not necessarily limited to the specific features or acts described. Rather, the specific features and acts are disclosed as exemplary forms of implementing the claimed system and method.

We claim:

1. A cargo roller tray shear fitting comprising:
 a base plate having at least one slot to couple the cargo roller tray shear fitting to a support beam;
 a first lug having at least one lug opening coupled to a cargo roller tray, the first lug extending from the base plate;
 a second lug having at least one lug opening, the second lug extending from the base plate, the first and second lugs are approximately parallel; and a web, the web extending from the base plate and separating the first and second lugs.

2. The fitting of claim 1, further comprising a plurality of web extensions extending from and parallel to the web, the plurality of web extensions comprising at least one web hole.

3. The fitting of claim 2, wherein the cargo roller tray shear fitting is fastened to a flange of the support beam via the at least one web hole to further secure the cargo tray to the support beam.

4. A structure comprising:
 a support beam;
 a cargo roller tray; and
 a shear fitting to couple the cargo roller tray to the support beam, the shear fitting comprising:
  a back having at least one slot, the shear fitting coupled to the support beam via the at least one slot, the at least one slot permitting the shear fitting to shift a predetermined distance along a length of the support beam; and
  a first lug having a first lug opening, the first lug extending from the back, the shear fitting coupled to the cargo roller tray via the first lug opening.

5. The structure of claim 4, wherein the shear fitting further comprises:
 a second lug having a second lug opening, the second lug extending from the back, the shear fitting further coupled to the cargo roller tray via the second lug opening.

6. The structure of claim 5, wherein the shear fitting further comprises a web, the web extending from the back and separating the first and second lugs.

7. The structure of claim 6, further comprising at least one web extension extending from and parallel to the web, the at least one web extension comprising at least one web hole.

8. The structure of claim 7, wherein the shear fitting is fastened to a flange of the support beam via the at least one web hole.

9. An airplane comprising:
a fuselage having a floor beam;
a cargo roller tray; and
a shear fitting to couple the cargo roller tray to the floor beam, wherein the shear fitting comprises:
 a base plate having at least one slot to couple the shear fitting to the floor beam, the at least one slot to permit the shear fitting to shift a predetermined distance along the floor beam; and
 a first lug having a first lug opening to couple the shear fitting to the cargo roller tray, the first lug extending from the base plate.

10. The airplane of claim 9, wherein the shear fitting further comprises:
 a second lug having a second lug opening to further couple the shear fitting to the cargo roller tray, the second lug extending from the base plate.

11. The airplane of claim 10, wherein the shear fitting further comprises a web, the web extending from the base plate and separating the first and second lugs.

12. The airplane of claim 11, further comprising at least one web extension extending from and parallel to the web, the at least one web extension comprising at least one web hole.

13. The airplane of claim 12, wherein the shear fitting is fastened to a flange of the floor beam via the at least one web hole.

* * * * *